United States Patent
Gupta et al.

(10) Patent No.: US 8,660,979 B2
(45) Date of Patent: Feb. 25, 2014

(54) EVENT PREDICTION

(75) Inventors: Chetan Kumar Gupta, Austin, TX (US); Song Wang, Austin, TX (US); Abhay Mehta, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 13/040,171

(22) Filed: Mar. 3, 2011

(65) Prior Publication Data

US 2012/0226652 A1    Sep. 6, 2012

(51) Int. Cl.
G06F 9/44 (2006.01)
G06N 7/02 (2006.01)
G06N 7/06 (2006.01)

(52) U.S. Cl.
USPC ............... 706/52; 707/740; 726/23; 717/106

(58) Field of Classification Search
None
See application file for complete search history.

(56) References Cited

U.S. PATENT DOCUMENTS

| | | | |
|---|---|---|---|
| 2004/0025044 A1* | 2/2004 | Day | 713/200 |
| 2006/0106626 A1* | 5/2006 | Jeng et al. | 705/1 |
| 2012/0078912 A1* | 3/2012 | Gupta et al. | 707/740 |

OTHER PUBLICATIONS

Bloom-Based Filters for Hierarchical Data Georgia Koloniari, Evaggelia Pitoura Department of Computer Science University of Ioannina, Greece {kgeorgia, pitoura}@cs.uoi.gr 2003, 5th workshop on distributed data structures and algorithms.*
"EMC Ionix for IT Operations Intelligencye," www.emc.com, copyright 2011.
IBM Tivoli Enterprise Console, brochure available from IBM, copyright 2006.
J. Agrawal et al., "Efficient pattern matching over event streams," Procs. of SIGMOD 2008, Jun. 9-12, 2008.
B. Bloom, "Space/time trade-offs in hash coding with allowable errors," Communications of the ACM, Jul. 1970.
C.L. Forgy, "Rete: A fast algorithm for the many pattern/many object pattern match problem," Artificial Intelligence, 1982.
M. Steinder et al., "A survey of fault localization techniques in computer networks," Science of Computer Programming, 2004.

* cited by examiner

*Primary Examiner* — Kakali Chaki
*Assistant Examiner* — Luis Sitiriche

(57) ABSTRACT

A selected set of one or more first events that have occurred within current data is received. An episode set of which the selected set is a subset, the episode set including one or more second events that have occurred within historical data related to the current data is identified. One or more third events that occurred within the historical data within a predetermined time horizon after the one or more second events of the episode set occurred within the historical data are identified. The one or more third events are predicted to likely occur within the current data as a result of the one or more first events having occurred within the current data.

15 Claims, 4 Drawing Sheets

IDENTIFY SECOND EPISODE SETS INCLUDING FOURTH EVENTS — 502

↓

FOR EACH FOURTH EVENT, DETERMINE FREQUENCY — 504

↓

SELECT EACH FOURTH EVENT FOR WHICH THE FREQUENCY IS GREATER THAN A THRESHOLD — 506

IDENTIFY SECOND EPISODE SETS INCLUDING FOURTH EVENTS — 602

↓

FOR EACH SECOND EPISODE SET, DETERMINE DISTANCE — 604

↓

SELECT THE FOURTH EVENTS HAVING A LOWEST DISTANCE — 606

EVENT PREDICTION

BACKGROUND

Operations management and control environments are plentiful in modern life. One example of such an environment is a large transportation network, such as the airspace network through which commercial and private planes fly, the network of rails on which passenger and freight trains travel, and so on. Another example of such an environment is a large computer system, such as a data center having hundreds, thousands, or even more of computing devices. A third example is an energy grid, such as the electrical grid that transports electrical power from electricity generators to electricity consumers, as well as the pipeline grid that transports natural gas.

In many operations management and control environments, data is constantly being received on which basis human operators are to perform management and control operations. For example, the human operators within such environments may have to constantly fine-tune the constituent networks, systems, and/or grids on the basis of the received data so that they continually operate as desired. As another example, the human operators may further have to detect problems on the basis of the received data so that the problems can be rectified quickly.

BRIEF DESCRIPTION OF THE DRAWINGS

FIG. 5 is a flowchart of an example method for identifying events predicted to likely occur within the current data, using a stateless event prediction approach.

FIG. 6 is a flowchart of an example method for identifying events predicted to likely occur within the current data, using a stateful event prediction approach.

DETAILED DESCRIPTION

As noted in the background section, in many operations management and control environments, data is constantly being received on which basis human operators perform management and control operations. To assist these human operators in making management and control decisions, and/or to at least partially remove the human element from these decisions, tools can be developed to predict events that are likely to occur next within the environments on the basis of the data. An event encompasses a current measurement within the data, a change of state in the environment in question, as well as a conclusion drawn from the data, which may take the form of a message.

Existing event prediction tools are predicated on rules. One or more developers work in unison with users that are experts in a given domain to craft rules that when applied to the data will be able to accurately predict events that are likely to occur next within a given operations management and control environment. This rule-development process is time-consuming and costly, however. Furthermore, after the rules have been developed, they have to be periodically if not constantly maintained, to ensure that the rules encompass new events that should be predicted, as well as existing events that have been found to occur in previously unknown ways.

Disclosed herein are techniques for predicting events that are not predicted on rules. A selected set of first events that have occurred within current data is received. The first events may be identified by a user, for instance, as being the events of interest that have occurred within the current data. An episode set of which the selected set is a subset is identified. The episode set includes second events that have occurred within historical data related to the current data. For instance, the historical data may be of the same type of data as the current data, but may have been generated some time ago.

One or more third events that occurred within the historical data within a predetermined time horizon after the second events of the episode set occurred are then identified. These third events are thus predicted to likely occur within the current data as a result of the first events having occurred within the current data. The various parts of this event prediction process are not performed using rules. Therefore, the time and expense of engaging in a rule-development process for event prediction are avoided. Indeed, the identification of the episode set and of the third events can be performed with minimal preprocessing—or even no preprocessing—of the historical data.

Figure 1:
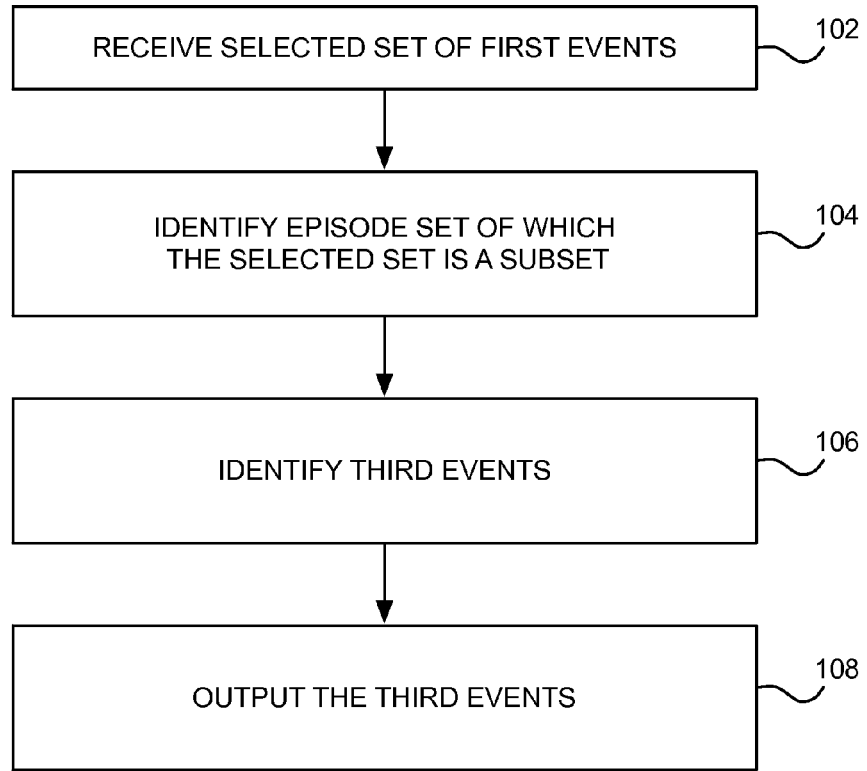
FIG. 1 is a flowchart of an example method for predicting events that are likely to occur within current data as a result of identified events having already occurred within the current data.

FIG. 1 shows an example method 100 for predicting events that are likely to occur within current data as a result of identified events having already occurred within the current data. The method 100 may be performed by a processor executing a computer program. The computer program may be stored a non-transitory computer-readable data storage medium, such as a hard disk drive, a volatile or non-volatile semiconductor memory, and so on.

A selected set of one or more first events that have occurred within the current data is received (102). The current data is data that has just or recently been received, such as in relation to an operation management and control environment. For example, in the context of a large computer system, the data may include sensor data, such as temperature readings, humidity readings, and so on, as well as data from the constituent computing devices, such as storage space remaining, processor utilization, memory utilization, and so on.

As noted above, an event encompasses a current measurement within the data, or as a conclusion drawn from the data, which may take the form of a message. Thus, the first events may include specific data selected from the current data, as well as conclusions drawn from the data. For example, in the context of a large computer system, the first events may include readings of specific sensors or sets of sensors, messages received from the computing devices indicating their utilization, and so on. These events are referred to as first events solely to distinguish the events from other events. The current data itself may include the first events as well.

A user, such as a human operator working within the operation management and control environment, may identify the first events as events of interest that have occurred within the current data. The user, for instance, may be trained to look for anomalies or unusual occurrences within the current data. When such anomalies or occurrences are detected by the user, the user selects the corresponding events as the first events of the method 100. In this sense, the set of first events can be a selected set of events.

One or more episode sets, each of which the selected set is a subset, are then identified (104). Each episode set includes second events that have occurred within historical data. The events of the episode sets are referred to as second events solely to distinguish them from other events, such as the first events of the selected set. A set of such second events is referred to as an episode set insofar as the events of the set are distinctive in some respect, such as in that the events tend to occur at or near the same time, have the same underlying cause, and so on.

The historical data is related to the current data. For example, after a certain length of time has transpired, the current data may become the historical data. As another example, the historical data may be older data from the same or similar operation management and control environment within which the current data is being generated, and which has been appropriately analyzed to determine a collection of episode sets from which the episode sets of which the selected set is a subset are identified.

The collection of episode sets may include each unique set of events that have occurred within the historical data. Alternatively, each episode set within the collection may be pre-defined by a user, such as a skilled human operator that has experience with the operation management and control environment in question. In this latter example, each episode set represents a unique set of events of interest within the historical data, which has been correlated within the historical data with other events occurring, which may be part of or apart from the episode set in question.

Once the episode sets, each of which the selected set is a subset, have been identified, third events that occurred within the historical data within a predetermined time horizon after the second events of the episode set occurred are identified (106). These events are referred to as third events solely to distinguish them from other events, such as the first events of the selected set and the second events of the episode sets. However, a third event may also be a second event in some implementations of the example method 100.

As an example of a third event, an episode set may include two second events: one corresponding to a fan failure of a computing device, and another corresponding to an increased temperature of the computing device. Within the historical data, a third event of this computing device failing may be correlated with these two second events. That is, after a computing device fan has failed, and after the computing device has reported an increased temperature, a third event of the computing device having failed may have occurred within a predetermined time horizon afterwards.

The length of the time horizon may be selected by a user, such as the human operator within the operation management and control environment in question, and may further may dependent on the environment in question. For example, events may transpire in some environments more slowly than others, such that the length of the time horizon in the former environments may be longer than in the latter environments. As another example, a user may be interested in short-term correlative events in some situations, but may be interested in long-term correlative events in other situations.

Once the third events have been identified, they can be output as being predicted to likely occur within the current data as a result of the first events having already occurred within the current data (108). For example, a user may be notified by a graphical user interface (GUI) of a computing device that as a result of the selected set of first events occurring, it is likely that one or more third events will also occur within a length of time equal to the predetermined time horizon. As such, even if the user is relatively unskilled, he or she may be able to take corrective action to prevent the third events from occurring, or to ameliorate the effects of the occurrence of these third events.

The example method 100 that has been described has several characteristics. First, rules are not analyzed within the method 100. As such, the time and expense associated with developing such a rules-based system are avoided. Second, the third events that are predicted as likely to occur within the current data are based on an analysis of the historical data, using episode sets of second events within the historical data, where the selected set of first events of the current data is a subset of each episode set. That is, the historical data is leveraged in an analytically correlative manner to determine the third events that are likely to occur within the current data.

The prediction that the third events are likely to occur within the current data, as a result of the selected set of first events having already occurred within the current data, is not an absolute prediction but rather is a prediction of likelihood in at least two respects. First, insofar as the prediction has been made before the third events have occurred within the current data, corrective action may be taken to avoid the third events from occurring. That is, the occurrence of the third events within the current data is not a foregone conclusion since the third events may be predicted sufficiently ahead of time that they can be avoided with appropriate action.

Second, while the occurrence of the second events of the episode sets identified in part 104 resulted in the third events occurring within the historical data, this fact may be correlative and not causative. As such, just because the current data includes first events of a selected set that is a subset of the episode sets that resulted in third events later occurring within the historical data does not mean that the third events are also going to occur within the current data. In this respect, the third events may be predicted to likely occur insofar as the third events are predicted to occur within various confidence or likelihood values. For example, one third event may be associated with a 90% confidence or likelihood value that this event will occur, whereas another event may be associated with a 75% such value that it will occur.

Identifying the one or more episode sets of which the selected set is a subset, from a collection of episode sets, may be performed in part 104 by employing Bloom filters. An empty Bloom filter is a bit array of m bits that are each set to zero. A Bloom filter is associated with k different hash functions, each of which maps or hashes the second events of an episode set to one of the m array positions with a uniform random distribution. Thus, for a particular episode set, the second events thereof are each input into each of the k hash functions. The resulting k array positions from each second event are set to one within the bit array.

To determine if a selected set of first events is a subset of an episode set having a corresponding Bloom filter, each first event of the first set is also input into each of the k hash functions. If the resulting k array positions from each first event are each equal to one within the bit array for the episode set, then the selected set is likely a subset of the episode set. However, if any of the resulting k array positions from each first event is not equal to one within the bit array for the episode set, then the selected set is definitely not a subset of the episode set. Thus, Bloom filters can yield false positive results but not false negative results, the former which are minimized by having greater numbers of m bits within the bit array, and/or by having greater numbers of k hash functions.

In some example implementations, it is assumed that the Bloom filters do not yield false positive results. For example, the values of m and k may be sufficiently high that the probability that a false positive result occurs is low enough to be discounted. In other example implementations, however, each Bloom filter that yields a positive result has its corresponding episode set tested to ensure that the episode set is indeed a superset of the selected set.

Figure 2:
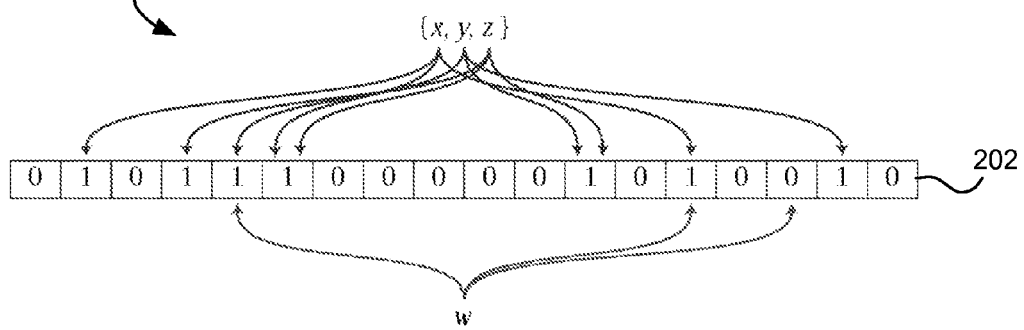
FIG. 2 is a diagram of an example Bloom filter for an example episode set that can be employed in the method of FIG. 1.

FIG. 2 shows an example Bloom filter 200 for an episode set. The Bloom filter 200 includes a bit array 202 having m=18 bits that are each initially set to zero. There are k=3 hash functions. The episode set includes three second events x, y, and z. Each second event is input to each hash function. Therefore, each second event results in three bits of the bit array 202 being set. However, there are less than nine set bits within the bit array 202, because two of the bits are each set to one by two of the second events.

The selected set of first events in the example of FIG. 2 includes one first event w. This first event is also input to each hash function. If the bits output by the hash functions resulting from the first event are each one in the bit array 202 of the Bloom filter 200, then the selected set is likely a subset of the episode set. However, as depicted in FIG. 2, one hash function results in a bit that has not been set to one within the bit array 202. Therefore, the example selected set is definitively not a subset of the example episode set having the Bloom filter 200.

One way to employ Bloom filters in part 104 to identify the episode sets of which the selected set is a subset is thus to apply the selected set of first events against the Bloom filter of each episode set within the collection of episode sets. Any episode set that has bits set in correspondence to the bits resulting from inputting the first events of the selected set into the hash functions is therefore a superset of the selected set. That is, the selected set is a subset of each such episode set.

Figure 3:
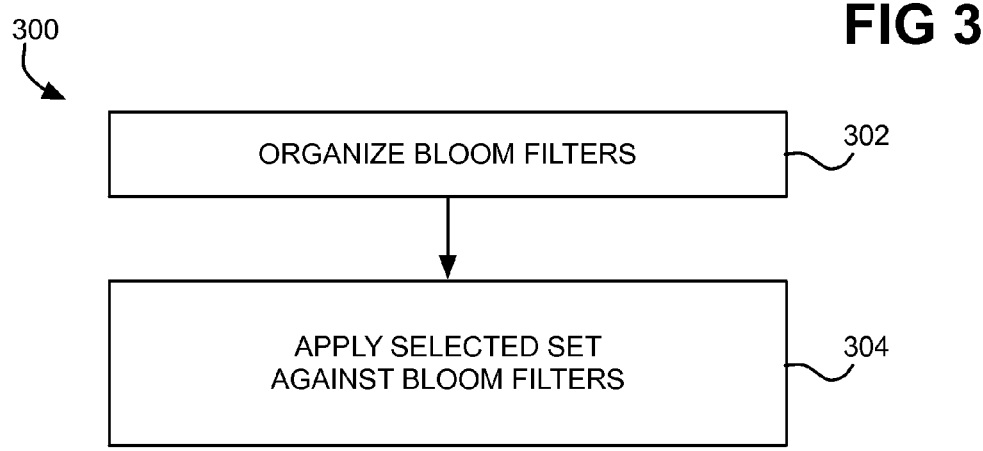
FIG. 3 is a flowchart of an example method for using Bloom filters to determine the episode sets that are supersets of a selected set, for use in the method of FIG. 1.

FIG. 3 shows an example method 300 of another way to employ Bloom filters in part 104 of the method 100 to identify the episode sets of which the selected set is a subset. The Bloom filters for the episode sets of the collection of episode sets are organized over a hierarchical tree (302). The hierarchical tree has nodes, where each leaf node corresponds to the Bloom filter of a different episode set. The nodes themselves are organized in form of a tree, from a first level to a last level. The Bloom filter of each node in each level except the level of the leaf nodes is a "logical or" operation result of the values in the portion of the tree the below it.

The selected set is applied against the Bloom filters of the nodes of the hierarchical tree, starting at the first level and proceeding towards the last level, to locate the Bloom filter of a highest-level node that the selected set satisfies (304). The selected set is a subset of the episode set of this highest-level node, and of the episode set of each node that is below the highest-level node within the hierarchical tree to which the highest-level node is connected. Therefore, the method 300 is advantageous in that the selected set does not necessarily have to be applied to all the episode sets of the collection of the episode sets to locate the episode sets that are supersets of the selected set.

Figure 4:
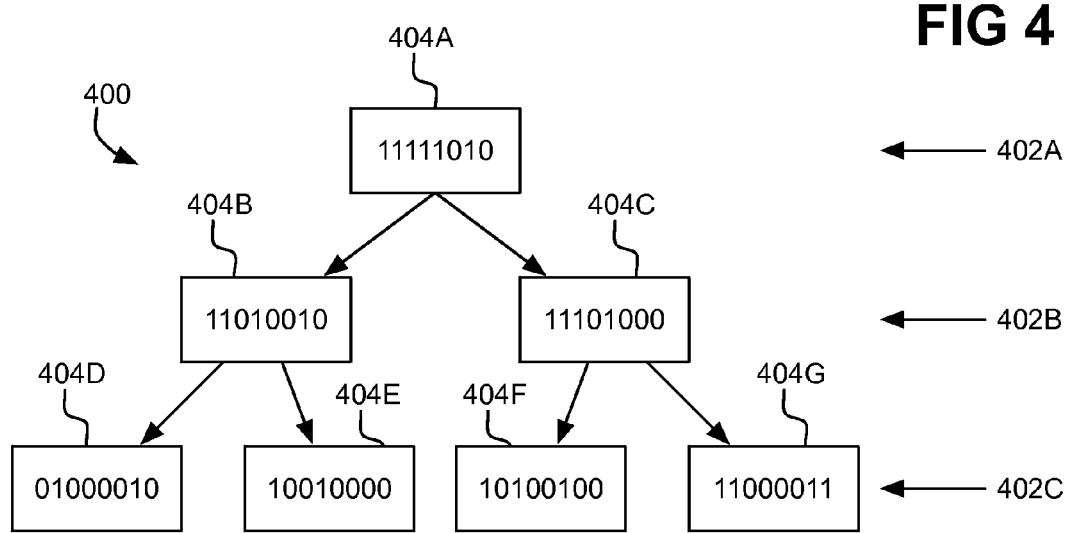
FIG. 4 is a diagram of an example hierarchical tree of example Bloom filters that can be employed in the method of FIG. 3.

FIG. 4 shows an example hierarchical tree 400 in relation to which performance of the method 300 is more concretely described. The hierarchical tree 400 includes three levels 402A, 402B, and 402C, which are collectively referred to as the levels 402, and where the level 402A is the first level and the level 402C is the last level. The hierarchical tree 400 includes seven nodes 404A, 404B, 404C, 404D, 404E, 404F, and 404G, which are collectively referred to as the nodes 404.

Each node 404 corresponds to a Bloom filter for a different episode set. There are thus seven episode sets in the collection of episode sets. Furthermore, the Bloom filter of each node 404 is a logical or operation result of the Bloom filters of the nodes 404 that are below the node 404 in question and to which this node 404 is connected. For example, the nodes 404D and 404E are connected to the node 404B and are below the node 404B. As such, the Bloom filter of the node 404B is a logical or result of the Bloom filters of the nodes 404D and 404E.

Similarly, the nodes 404F and 404G are connected to the node 404C and are below the node 404C, such that the Bloom filter of the node 404C is a logical or result of the Bloom filters of the nodes 404F and 404G. The nodes 404B and 404C are themselves connected to and are below the node 404A. As such, the Bloom filter of the node 404A is a logical or result of the Bloom filters of the nodes 404B and 404C.

The selected set of first events is applied to the Bloom filter of each node 404, starting from the node 404A at the top level 402A and proceeding towards the nodes 404D, 404E, 404F, and 404G of the last level 402C. Such application continues until a level 402 is identified that includes one or more nodes 404 that have Bloom filters that the first events satisfy. The episode sets that are supersets of the selected set in question are then identified as the episode set of each such node 404, and the episode set of each set node 404 below these nodes, if any.

As a first example, assume that the selected set of first events satisfies the Bloom filter of the node 404A within the top level 402A. Therefore, it is known that the selected set is a subset of the episode set of each node 404, even though the selected set was applied against just the Bloom filter of the node 404A. This is because the node 404A is connected to the nodes 404B and 404C that are below the node 404A, and because the nodes 404B and 404C themselves are connected to the nodes 404D and 404E and the nodes 404F and 404G, respectively, which are below the nodes 404B and 404C.

As a second example, assume that the selected set of first events satisfies the Bloom filter of the node 404C within the level 402B, but not the Bloom filter of the node 404A within the top level 402A. The selected set is first applied to the Bloom filter of the node 404A within the top level 402A, and it is thus determined that the episode set of the node 404A is not a superset of the selected set. The selected set is then next applied to the Bloom filters of the nodes 404B and 404C within the next level 402B, and it is thus determined that the episode set of the node 404B is not a superset of the selected set, but that the episode set of the node 404C is a superset of the selected set.

Therefore, it is known that the selected set is a subset of the episode set of the node 404C, and also is a subset of the episode set of each node 404F and 404G. This is because the node 404C is connected to the nodes 404F and 404G that are below the node 404C. Furthermore, it is known that the selected set is definitively not a subset of the episode set of each node 404A, 404B, 404D, and 404E. This is because since the selected set is a subset of the episode set of the node 404C but is not a subset of the episode set of the node 404B, then the selected set cannot be a subset of either node 404D or 404E that is below and connected to the node 404B.

As noted above, once the episode sets that are supersets of the selected set have been identified, third events that occurred within the historical data within a time horizon after the second events of the episode sets occurred are then identified, in part 106 of the method 100. The third events may be identified in accordance with a stateless event prediction approach, or a stateful event prediction approach. A state of an event includes the raw data on which basis the event occurs—that is, the raw data that was generated or obtained at the time the event occurred.

For example, within a computer system, an event may be that a computing device is overutilized. This event may be based on the current processor utilization of the computing device. As such, the state of this event includes the current processor utilization of the computing device. The state may further include additional raw data, such as the current temperature of the processor, the number of instructions per processor cycle that the processor is executing, and so on. In some cases, the state of an event includes the values for each type of raw data that is available.

A stateless prediction approach does not consider the states of the third events and the states of the second events of the episode sets in identifying the third events. By comparison, a stateful prediction approach does consider the states of the third events and the states of the second events in identifying the third events. The state of each third event includes the raw historical data, which may be in a synopsis form, on which basis the third event in question occurs. Likewise, the state of each second event includes the raw historical data, which may also be in a synopsis form, on which basis the second event in question occurs.

FIG. 5 shows an example method 500 for identifying the third events in part 108 of the method 100 using a stateless event prediction approach. In the description of the method 500, the episode sets identified in part 104 of the method 100 are referred to as first episode sets. The method 500 further introduces second episode sets, which are different from but related to the first episode sets. Each second episode set includes one or more events, referred to herein as fourth events to distinguish them from the first, second, and third events that have been described. The fourth events are events that occurred within the historical data within the predetermined time horizon after the second events of the first episode sets have occurred. It is noted that the third events are a subset of the fourth events.

As such, these second episode sets are identified (502). For example, from the collection of episode sets, each episode set that includes a (fourth) event that occurred within the historical data within the predetermined time horizon after any second event of any first episode set can be identified as a second episode set. Stated another way, the (fourth) events that occurred within the historical data within the predetermined horizon after any second event of any first episode set is located, and any episode set of the collection of episode sets that includes any such (fourth) event is identified as one of the second episode sets.

For each fourth event that is present in at least one of the second episode sets, the frequency at which the fourth event occurs within the second episode sets is determined (504). As an example, assume that there are four second episode sets: {1, 2, 3, 4, 5}; {1, 7, 8, 9}; {1, 2, 8, 9, 3}; and, {1, 2, 3, 4, 6}. Each number in each of these sets represents a fourth event. There are thus nine unique fourth events, numbered one through nine. For each of these fourth events, the number of the second episode sets in which the fourth event in question appears is determined as the frequency of this fourth event. For example, event 1 appears in all four second episode sets, so its frequency is four. Event 2 appears in three of the second episode sets, and thus has a frequency of three. Events 3, 4, 5, 6, 7, 8, and 9 similarly have frequencies of three, two, one, one, one, one, and two, respectively. The fourth events that have frequencies greater than a threshold are each selected as one of the third events (506). The threshold may be predetermined a priori, or may be dynamically determined so that a certain percentage or number of the fourth events are selected as the third events. In the example of the previous paragraph, for instance, if the threshold is two, then events 1, 2, and 3 are selected as the third events in part 506. Thus, the third events are a subset of the fourth events.

FIG. 6 shows an example method 600 for identifying the third events in part 108 of the method 100 using a stateful event prediction approach. As in the description of the method 500, the episode sets identified in part 104 of the method 100 are referred to as first episode sets. The method 600 also introduces second episode sets, which are different from but related to the first episode sets. Each second episode set includes one or more events, referred to herein as fourth events to distinguish them from the first, second, and third events that have been described. The fourth events are, as before, events that occurred within the historical data within the predetermined time horizon after the second events of the first episode sets have occurred.

As in the method 500, then, the method 600 identifies these second episode sets (602). For each second episode set, the distance between the first episode set and the second episode set is determined (604), based on the states of the first and second episode sets. A state here can be the raw data, such as in synopsized form, at the time the events of a corresponding episode set occurred. Furthermore, the distance may be a Euclidean distance.

As one example, a wavelet transform may be applied to the raw data at the time of the second events of the first episode set occurred, and to the raw data at the time of the fourth events of the second episode set occurred. Application of the wavelet transform yields a wavelet coefficient for each such state, such as a top-k wavelet coefficient. The first episode set thus includes a vector of wavelet coefficients of the second events of this episode set, and likewise each second episode set includes a vector of wavelet coefficients of the fourth events of the second episode set in question. Thereafter, the Euclidean distance between the vector of the first episode set and the vector of each second episode set is determined. The fourth events of the second episode set having the lowest distance to the first episode set are selected as the third events (606).

Figure 7:
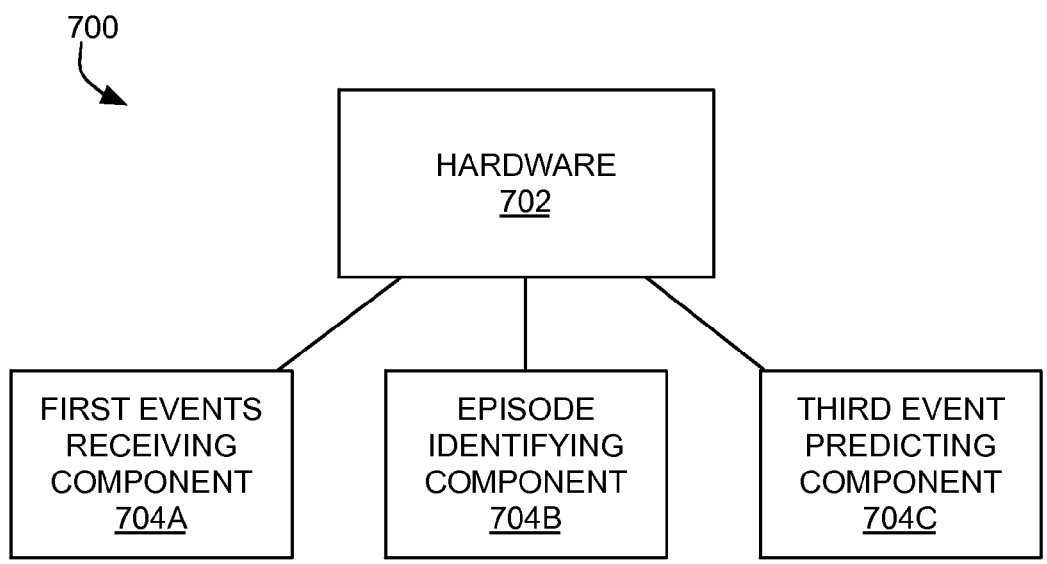
FIG. 7 is a diagram of an example system.

FIG. 7 in conclusion shows an example system 700. The system 700 may be implemented over one or more computing devices, such as desktop and laptop computers. The system 700 includes hardware 702, and a number of components 704A, 704B, and 704C, collectively referred to as the components 704. The hardware 702 can include one or more processors, memory, storage devices, and other types of hardware.

The components 704 can be software components, hardware components, or combination software-and-hardware components. In the latter two cases, the components 704 are thus said to be implemented at least partially by the hardware 704. For example, the components 704 may be or include one or more computer programs that are executed by and/or from the hardware 704. The component 704A is particularly a first events receiving component.

The component 704A performs part 102 of the method 100 of FIG. 1, to receive the selected set of first events that have occurred within the current data. For instance, the component 704A may implement a GUI or another type of user interface by which a user is able to identify first events of interest that have occurred within the current data.

The component 704B is particularly an episode identifying component. The component 704B performs part 104 of the method 100, to identify one or more episode sets of which the select set of first events is a subset, where the episode sets include second events that have occurred within historical data. The component 704B may employ Bloom filters in this respect, as has been described.

Finally, the component 704C is particularly a third event predicting component. The component 704C performs part 106 of the method 100, to identify third events that occurred within the historical data within a time horizon after the second events of the episode sets occurred, where these third events are predicted as likely to occur within the current data as well. The component 704C may employ a stateless event prediction approach, or a stateful event prediction approach, as has been described.

We claim:

1. A method comprising:
   receiving, by a processor, a selected set of one or more first events that have occurred within current data;
   identifying, by the processor, an episode set of which the selected set is a subset, the episode set including one or more second events that have occurred within historical data related to the current data;
   identifying, by the processor, one or more third events that occurred within the historical data within a predetermined time horizon after the one or more second events of the episode set occurred within the historical data; and,
   outputting, by the processor, the one or more third events as being predicted to likely occur within the current data as a result of the one or more first events having occurred within the current data,
   wherein identifying the one or more third events comprises employing one of a stateless event prediction approach and a stateful prediction approach,
   and wherein the one or more second events and the one or more third events are different from the one or more first events.

2. The method of claim 1, wherein receiving the selected set of the one or more first events comprises receiving the one or more first events of the selected set as identified by a user as being one or more events of interest that have occurred within the current data.

3. The method of claim 1, wherein identifying the episode set comprises employing a plurality of Bloom filters corresponding to a plurality of episode sets.

4. The method of claim 3, wherein employing the Bloom filters comprises, for each Bloom filter, applying the selected set against the Bloom filter to determine whether the selected set is a subset of the episode set to which the Bloom filter corresponds.

5. The method of claim 3, wherein employing the Bloom filter comprises:
   organizing the Bloom filters over a tree having a plurality of nodes corresponding to the Bloom filters and a plurality of levels including a first level and a last level over which the nodes are organized, where for the Bloom filter of each node in each level except the last level, the Bloom filter is a "logical or" operation result of the Bloom filters of the nodes that are below the node and to which the node is connected within the tree; and,
   applying the selected set against the Bloom filters of the nodes of the hierarchical tree starting at the first level and proceeding towards the last level, to locate the Bloom filter of a highest-level node that the selected set satisfies,
   wherein the selected set is a subset of the episode set of the highest-level node and of the episode set of each node that is below the highest-level node and to which the highest-level node is connected within the hierarchical tree.

6. The method of claim 1, wherein identifying the one or more third events comprises employing the stateless event prediction approach, such that a state of each first event and a state of each second event are not considered in identifying the one or more third events, where a state of a given event includes raw data at a time the given event occurs.

7. The method of claim 6, wherein the episode set is a first episode set, and wherein employing the stateless event prediction approach comprises:
   identifying a plurality of second episode sets, each second episode set including one or more fourth events that occurred within the historical data within the predetermined time horizon after the one or more second events of the first episode set;
   for each fourth event of each second episode set, determining a frequency at which the fourth event occurs within the second episode sets; and,
   selecting each fourth event for which the frequency is greater than a threshold as one of the one or more third events.

8. The method of claim 1, wherein identifying the one or more third events comprises employing the stateful event prediction approach, such that a state at a time of the first events and a state at a time of the second events are considered in identifying the one or more third events, where a state of a given event includes raw data at a time the given event occurs.

9. The method of claim 8, wherein the episode set is a first episode set, and wherein employing the stateful event prediction approach comprises:
   identifying a plurality of second episode sets, each second episode set including one or more fourth events that occurred within the historical data within the predetermined time horizon after the one or more second events of the first episode set;
   for each second episode set, determining a distance between the first episode set and the second episode set; and,
   selecting the one or more fourth events of the second episode set for which the distance to the first episode set is lowest.

10. The method of claim 9, wherein determining the distance between the first episode set and the second episode set comprises determining a Euclidean distance between a wavelet coefficient vector of the first episode set and a wavelet coefficient vector of the second episode set, where a wavelet coefficient vector of a given episode set having one or more given events includes one or more wavelet coefficients corresponding to the one or more given events.

11. A system comprising:
    hardware;
    a first component to receive a selected set of one or more first events that have occurred within current data;
    a second component to locate an episode set of which the selected set is a subset, the episode set including one or more second events that have occurred within historical data related to the current data; and,
    a third component to locate one or more third events that occurred within the historical data within a predetermined time horizon after the one or more second events of the episode set occurred within the historical data,
    wherein the one or more third events are predicted to likely occur within the current data as a result of the one or more first events having occurred within the current data,
    wherein at least one of the first component, the second component, and the third component is implemented at least by the hardware,
    wherein third component is to employ one of a stateless event prediction approach and a stateful event prediction approach to identify the one or more third events, and wherein the one or more second events and the one or more third events are different from the one or more first events.

12. The system of claim 11, wherein the first component is to receive the one or more first events of the selected set as identified by a user as being one or more events of interest that have occurred within the current data.

13. The system of claim 11, wherein the second component is to employ a plurality of Bloom filters corresponding to a plurality of episode sets to identify the episode set.

14. The system of claim 11, wherein in the stateless event prediction approach, a state of each third event and a state of each second event are not considered in identifying the one or more third events,
   wherein in the stateful event prediction approach, the state at a time of the third events and the state at a time of the second events are considered in identifying the one or more third events,
   and wherein a state of a given event includes raw data at a time the given event occurs.

15. A non-transitory computer-readable data storage medium storing a computer program that when executable by a processor causes a method to be performed, the method comprising:

retrieving a selected set of one or more first events that have occurred within current data;

determining an episode set of which the selected set is a subset, the episode set including one or more second events that have occurred within historical data related to the current data; and, determining one or more third events that occurred within the historical data within a predetermined time horizon after the one or more second events of the episode set occurred within the historical data, wherein the one or more third events are predicted to likely occur within the current data as a result of the one or more first events having occurred within the current data, wherein determining the one or more third events comprises employing one of a stateless event prediction approach and a stateful prediction approach, and wherein the one or more second events and the one or more third events are different from the one or more first events.

* * * * *